US012509815B2

(12) United States Patent
Bringewatt et al.

(10) Patent No.: US 12,509,815 B2
(45) Date of Patent: Dec. 30, 2025

(54) METHOD FOR TREATING LAUNDRY ITEMS

(71) Applicant: Herbert Kannegiesser GmbH, Vlotho (DE)

(72) Inventors: Wilhelm Bringewatt, Porta Westfalica (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 614 days.

(21) Appl. No.: 17/591,710

(22) Filed: Feb. 3, 2022

(65) Prior Publication Data

US 2022/0290364 A1 Sep. 15, 2022

(30) Foreign Application Priority Data

Mar. 11, 2021 (DE) ......................... 102021105998.4
Mar. 23, 2021 (DE) ......................... 102021107266.2
Jun. 11, 2021 (DE) ......................... 102021115161.9

(51) Int. Cl.
*D06F 93/00* (2006.01)
*D06F 63/02* (2006.01)
(Continued)

(52) U.S. Cl.
CPC .............. *D06F 93/00* (2013.01); *D06F 63/02* (2013.01); *D06F 67/02* (2013.01); *D06F 89/00* (2013.01);
(Continued)

(58) Field of Classification Search
CPC ........ D06F 89/00; D06F 89/005; D06F 89/02; D06F 89/023; D06F 89/026; D06F 93/00;
(Continued)

(56) References Cited

U.S. PATENT DOCUMENTS 1,380,266 A * 5/1921 Strong .................... D06F 65/04 38/60
1,628,554 A * 5/1927 Gaetano .................. D06F 45/18 219/244
(Continued)

FOREIGN PATENT DOCUMENTS

EP 0982428 A1 3/2000
GB 2337254 A 11/1999
(Continued)

OTHER PUBLICATIONS

Machine Translation of Enami, JP-2016064114-A, Apr. 2016. (Year: 2016).*
(Continued)

*Primary Examiner* — David G Cormier
(74) *Attorney, Agent, or Firm* — Laurence P. Colton; Smith Tempel Blaha LLC

(57) ABSTRACT

Used laundry items are delivered unsorted to laundries. It has previously been usual to initially sort the laundry items after delivery and treat the sorted laundry items, at least by washing, drying, mangling and folding. The preliminary sorting is labor-intensive and time-consuming. The invention proposes to treat unsorted at least those laundry items which must be mangled. Only before folding are the still unsorted laundry items identified and folded in targeted fashion accordingly. After folding, the identified laundry items are sorted according to their identified criteria, in that folded laundry items with the same criteria are stacked on a respective stack of similarly treated and folded laundry items. This reduces the complexity of sorting laundry items.

16 Claims, 3 Drawing Sheets

(51) Int. Cl.
*D06F 67/02* (2006.01)
*D06F 89/00* (2006.01)
*D06F 89/02* (2006.01)
*D06F 95/00* (2006.01)
*D06H 3/02* (2006.01)
*G06T 7/00* (2017.01)

(52) U.S. Cl.
CPC .............. *D06F 89/02* (2013.01); *D06F 95/00* (2013.01); *D06H 3/02* (2013.01); *G06T 7/0004* (2013.01)

(58) Field of Classification Search
CPC ........ D06F 93/005; D06F 95/00; D06F 67/02; D06F 63/02; D06H 3/02; G06T 7/0004
See application file for complete search history.

(56) References Cited

U.S. PATENT DOCUMENTS 3,791,055 A * 2/1974 Bazelmans ............ D06F 67/04 38/11
5,551,175 A * 9/1996 Neyman ............... G01K 13/08 38/44
5,715,555 A * 2/1998 Reber ................ A47L 15/4295 68/12.02
9,187,253 B2 * 11/2015 Olivieri ................. B65G 17/20
2003/0019798 A1 * 1/2003 Capps .................... D06F 95/00 68/245
2008/0116273 A1 * 5/2008 Aldridge ................ D06F 93/00 414/13
2012/0228340 A1 * 9/2012 Sakane .................. D06F 89/02 223/37
2015/0096208 A1 * 4/2015 Bringewatt ............ D06F 69/02 38/55
2015/0292142 A1 * 10/2015 Tautz ...................... B25J 11/00 414/800
2020/0125905 A1 4/2020 Bing

FOREIGN PATENT DOCUMENTS

JP 2016064114 A * 4/2016
WO WO-03050342 A2 * 6/2003 ............ D06F 95/00

OTHER PUBLICATIONS

European Patent Office, Mitteilung (Office Action in a related application), Apr. 28, 2022.

* cited by examiner

METHOD FOR TREATING LAUNDRY ITEMS

CROSS REFERENCE TO RELATED APPLICATIONS

This patent application claims the benefit and priority on German Patent Application No. 10 2021 105 998.4 having a filing date of 11 Mar. 2021, German Patent Application No. 10 2021 107 266.2 having a filing date of 23 Mar. 2021, and German Patent Application No. 10 2021 115 161.9 having a filing date of 11 Jun. 2021.

BACKGROUND OF THE INVENTION

Technical Field

The invention concerns a method for treating laundry items wherein the laundry items are at least washed, dried, mangled, folded and stacked.

Prior Art

Usually, widely varying laundry items are delivered to laundries. These may be flat textile items to be mangled, such as bed linen and table linen, and textile items which are not to be mangled, such as for example toweling textiles or special items, for example workwear.

Previously, the widely varying types of laundry items were sorted after delivery. Because only bed linen and also table linen comprise different types and sizes of laundry items, sorting requires extensive equipment and labor. Above all the labor cost is high because the laundry items to be treated are still sorted mainly manually. Also, errors often occur during sorting performed by operating personnel, whereby laundry items undergo the wrong treatment, which in unfavorable cases leads to damage of incorrectly treated laundry items.

The sorted laundry items must also be temporarily stored in batches, in for example so-called sack conveyor systems, until they are treated, i.e., in their turn.

BRIEF SUMMARY OF THE INVENTION

The invention is based on the object of providing a method for treating laundry items which reduces the equipment and labor requirements in a laundry, reduces the space required and preferably can be at least largely automated.

A method for achieving the object is a method for treating laundry items, wherein the laundry items are at least washed, dried, mangled, folded and stacked, characterized in that laundry items to be mangled are at least washed, dried, mangled and folded unsorted. In this method, it is provided that laundry items to be mangled are treated, preferably at least washed, dried, mangled, and folded, unsorted. If the laundry receives only laundry items to be mangled, these need not be sorted before the first treatment. If laundry items which are not to be mangled, such as for example toweling items, are delivered together with the laundry items to be mangled, only the laundry items not to be mangled, e.g., toweling items, need be sorted out before treatment. This is a simple sorting process which requires few personnel and in some cases may also be performed automatically.

Preferably, it is provided that only laundry items to be mangled, which are flat laundry items, in particular table linen items and/or bed linen items, are at least washed, dried, mangled and preferably also folded unsorted. Said laundry items need not be sorted before treatment.

An advantageous possible refinement of the method provides that only before folding, or in some cases also even before mangling, an identification is made of each individual laundry item. Preferably, for example the nature, size, color, style of weave, folding and stacking criteria, and/or the recipient or customer of the respective laundry item, in particular the respective laundry item to be mangled, are determined, preferably contactlessly. Individual selected or in some cases all said determinations or criteria replace at least a majority of the sorting taking place before treatment, and are preferably performed automatically. It is also conceivable to determine other criteria before different treatments.

Preferably, the method is refined in that the laundry items are identified and individual or selected—but also in some cases all—features and/or subsequent treatment criteria thereof are determined by contactless read-out of data carriers assigned to the laundry items, in particular applied thereto, and/or contactless determination by at least one imaging device. The at least one imaging device, in particular camera, laser or similar, allows rapid, reliable and automatic determination in particular of the nature, size, color, pattern, weave structure and/or treatment parameters or criteria of each individual laundry item.

In a preferred embodiment of the method, mangling of the unsorted laundry items may take place at an unchanged mangling temperature (apart from certain fluctuations). The mangling temperature is a reduced mangling temperature which does not damage the most delicate laundry items to be mangled. Also, during mangling of sorted laundry items, it is conceivable that the flattening path and/or the mangling speed are selected such that laundry items which are difficult to mangle or not delicate, for example heavy or double-layered laundry items, are sufficiently finally dried during mangling. The or in any case an above-mentioned procedure allows, preferably with unchanged setting of the mangling parameters, mangling of different laundry items successively and in arbitrary order without sorting, such that delicate laundry items are not damaged but less delicate laundry items are sufficiently finally dried during mangling.

In another advantageous possible refinement of the method, it is provided that the laundry items are sorted after folding. Preferably, sorting takes place during or before stacking of folded laundry items.

Sorting takes place using corresponding criteria, preferably sorting criteria, which are determined automatically, preferably before folding but alternatively also before mangling. Sorting criteria may be the nature, dimensions and/or recipient or customer of the treated laundry items.

The above-mentioned measures, each individually but also in combinations of several measures, contribute to simplifying and automating the treatment, in particular the sorting of the laundry items.

According to an advantageous refinement of the method, it is provided that, by means of the determination of the folding criteria and/or stacking criteria which takes place before mangling or the latest before folding, the respective laundry item is folded individually in targeted fashion, and each folded laundry item is stacked in targeted fashion according to the respective stacking criterion or several stacking criteria, such as the nature and customer or recipient, on at least one stack of laundry items with the same stacking criterion. Thus, after the unsorted or where applicable presorted treatment of the laundry items, these are sorted so that the treated and folded laundry items can be stacked in targeted fashion on stacks of the same or at least similar laundry items for the same customer and/or recipient.

In the method, it may be provided that before washing, laundry items are only sorted according to whether they must be mangled or not mangled. Such sorting is easily possible because only laundry items not to be mangled, such as so-called dry laundry e.g., toweling items, must be separated from the other laundry items to be mangled, such as flat laundry items. In some cases, sorting may also take place according to so-called special items which cannot be treated together with the other laundry items. It is also conceivable to separate certain laundry items to be mangled from other laundry items to be mangled during presorting. For example, table linen items may be separated from bed linen items, so that only all bed linen items such as duvet covers, sheets and pillowcases are treated unsorted, and vice versa. Even in the latter case, there is a clear reduction in the sorting complexity because there is no need to sort bed linen into duvet covers, sheets and pillowcases.

If only laundry items to be mangled, in particular only bed linen and/or table linen items, are delivered to the laundry, sorting thereof before treatment may be omitted completely because laundry items to be mangled are treated unsorted in arbitrary order. Sorting only takes place after folding of the laundry items, i.e., of the fully treated laundry items. These are then sorted by type, and preferably also by customer and/or recipient, and stacked automatically on a stack, such that a stack contains only laundry items for a same recipient. For this, behind the or each folding machine, a number of stackers is provided which corresponds to the number of stacking criteria, for example for bed linen at least one stacker for duvet covers, at least one other stacker for sheets, and again at least one other stacker for pillowcases.

Another possible embodiment of the method is aimed at bringing together before folding different laundry items to be mangled with dried laundry items which are not to be mangled, preferably also in arbitrary order. Then these laundry items can be folded together with the mangled laundry items, preferably on the same folding machine or on different folding machines. After folding, the laundry items are stacked by type and simultaneously sorted so that stacks of the same or similar laundry items, preferably also customer-specific, are formed.

In order to be able to fold together different laundry items, both laundry items to be mangled and those not to be mangled, it may be provided that at the latest before the at least one stacker, all laundry items are identified contactlessly so that they can be folded and sorted in targeted fashion according to type and then stacked. Preferably, at the latest before the at least one stacker, the folding and/or stacking criterion and/or the recipient of each individual laundry item to be folded unsorted, are determined. For example, this may take place with at least one imaging device. On the basis of the resulting identification of the various laundry items, the different laundry items are stacked according to type, and in particular also sorted by recipient, on a respective stack or several similar stacks. Thus, the laundry items are only sorted shortly before the end of treatment, preferably only in their final treatment step.

Advantageously, several stackers are assigned to the same folding machine, or a group of required stackers is assigned to each of several folding machines, preferably downstream thereof relative to the output direction of folded laundry items from the folding machine. Here, all or at least some stackers may be provided below, behind and/or next to the respective folding machine. A stacker is provided at least for each stacking criterion to be expected. It is therefore also conceivable to provide several stackers for the same stacking criteria.

If an at least partial identification, in particular measurement of the laundry items to be mangled, takes place before mangling, this advantageously takes place before or at an input machine feeding the spreading and spread laundry items into the mangle. During measurement, at least the length of a front edge of the respective laundry item running transversely to the treatment device is determined, preferably before spreading of the laundry item by a spreading device of the input machine. During this, the front edge of the laundry items still sags. In larger laundry items in particular, this sag is so large that the front edge cannot be determined contactlessly, in particular by means of at least one imaging device. Therefore, it is provided to hold adjacent corners of the front edge in a pair of clamps, the distance between which is so large that even for larger laundry items, a defined, in particular V-shaped or U-shaped sag of the front edge occurs, which can be measured above all by an imaging device, in particular with respect to the maximum depth of the sag. The measurement of the front edge, in particular the transverse edge, before spreading of the laundry item, is particularly advantageous in the unsorted supply of differently sized laundry items to the mangle. Thus, the spreading process can be shortened and in some cases an optimal occupation of the mangle can be achieved.

BRIEF DESCRIPTION OF THE DRAWINGS

A preferred exemplary embodiment of the invention is explained in more detail below with reference to the drawing. This shows.

DETAILED DESCRIPTION OF PREFERRED EMBODIMENTS

Figure 1:
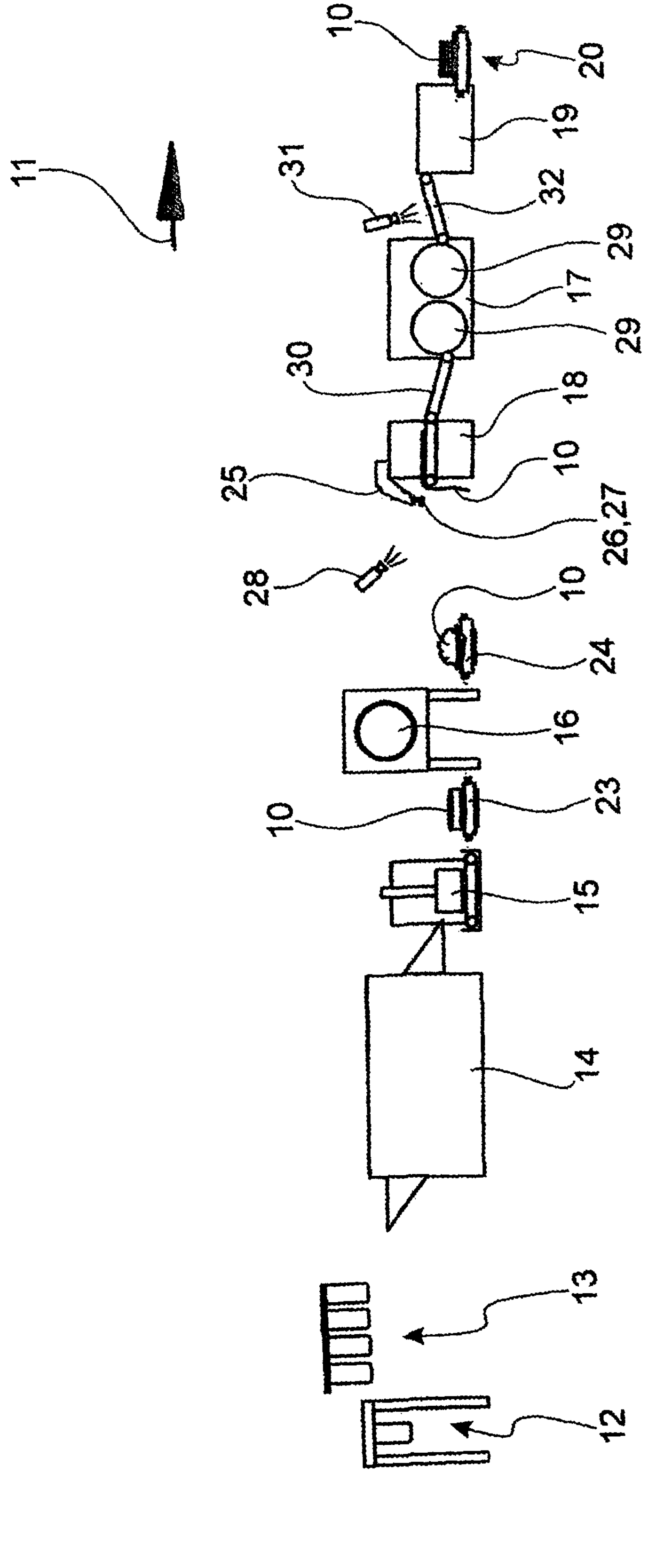
FIG. 1 is a schematic, side view of a treatment line for laundry items.

FIG. 1 shows a possible treatment line for performance of the method according to the invention. The treatment line serves to treat so-called mangling products. These are primarily flat laundry items such as bed linen and table linen. In FIG. 1, laundry items 10 are merely indicated partially.

The treatment line comprises, successively in the treatment direction 11, a sorting stand 12, a sack conveying system 13 depicted only symbolically and partially, a washing machine 14, a water extraction device 15, at least one dryer 16, at least one mangle 17 before which an input machine 18 is arranged, at least one folding machine 19, and a sorter-stacker 20 with a plurality of preferably identical stackers 21, each for similarly folded laundry items 10. The laundry items 10 pass through the treatment line in the treatment direction 11.

The sorting stand 12 is a simplified sorting stand 12 on which the laundry items 10 are merely presorted according to a few sorting criteria. Also, a simplified treatment line in comparison with the illustration in FIG. 1 is conceivable, which has no sorting stand 12 at its start if only laundry items 10 which are to be mangled after washing and drying are supplied. If only laundry items 10 to be mangled are supplied, in some cases a sorting stand 12 may still be provided if the laundry items 10 must be mangled separated into table linen and bed linen. Then only table linen items need be separated from bed linen items at the sorting stand 12, or vice versa.

In the treatment direction 11, the sorting stand 12 is followed by a store which is formed for example as a so-called sack conveyor system. Each sack of the sack conveyor system contains a batch of bed linen 10. The store always contains a sufficient stock of laundry batches to guarantee continuous washing of the laundry items 10.

The store is followed by the washing machine 14. The washing machine 14 depicted schematically in FIG. 1 is a continuous passage washing machine with an elongate cylindrical drum, which is rotatable about a central horizontal rotational axis and which comprises several successive chambers, each for receiving a respective laundry batch. The washed laundry items 10 leaving the washing machine 14 are transferred in batches to the water extraction device 15 arranged downstream of the washing machine 14 in the treatment direction 11. FIG. 1 shows schematically a water extraction device 15 configured as a drainage press. The water extraction device may also be a spin dryer or similar.

Behind the water extraction device 15 is a distribution conveyor 23 for washed and drained laundry items 10, in particular laundry batches. Several preferably identical dryers 16, arranged in a row next to one another, are assigned to the distribution conveyor 23, preferably behind this or next to this. The laundry batches can be transported by the distribution conveyor 23 transversely to the treatment direction 11 to the respective free dryer 16, which may then be loaded with laundry items 10 to be dried.

After the row of adjacent dryers 16 in the treatment direction 11, a collection conveyor 24 is arranged which moves the laundry items 10 in batches to a point from which the input machine 18 can be loaded with an individual laundry item 10. This may be done manually by one or more operators or also automatically by at least one handling device. These are not shown in FIG. 1. It is also conceivable to provide a laundry store between the collection conveyor 24 and the input machine 18, but this is also not shown in FIG. 1.

In a treatment line with only a single dryer 16, the distribution conveyor 23 and/or the collection conveyor 24 may be omitted.

The input machine 18 may be one which has several adjacent loading stations on the front side. Each loading station 25 has an assigned loading clamp pair 26 with two preferably identical loading clamps 27 which are spaced apart transversely to the treatment direction 11. The loading clamps 27 may be combined into a double clamp which then forms the loading clamp pair 26. Each of the two loading clamps 27 holds one of adjacent corners of a front edge running transversely to the treatment direction 11, in particular a transverse edge, of the respective laundry item 10.

The distance between the two loading clamps 27 of the loading clamp pair 26 or the double clamp is greater than usual, namely so large that a defined identifiable V-shaped or U-shaped sag of the front edge of the respective laundry item 10 is formed between the corners held spaced apart by the two loading clamps 27. In the treatment line shown in FIG. 1, an imaging device 28, configured for example as a camera, in particular a digital camera, or also a sensor strip, a laser fan or similar, is provided in front of the respective loading station 25. These depict or determine the V-shaped or U-shaped sag of the front edge of the laundry item 10 suspended from the loading clamps 27.

An alternative treatment line is conceivable in which no imaging device 28 is arranged in front of the input machine 18.

After the loading stations and loading clamp pairs 26 in the treatment direction 11, the input machine 18 has a spreader device with at least one pair of spreader clamps which can be moved together and apart transversely to the treatment direction 11. The spreading device and the spreader clamp pair are not shown in FIG. 1. The opposite corners of the front edge of the respective laundry item 10 can be transferred by the loading clamp pair 26 to the spreader clamp pair, or the adjacent corners of the front edge of the laundry item 10 can be taken by the spreader clamps of the spreader clamp pair from the loading clamps 27 of the respective loading clamp pair 26. A laundry item 10 stretched by the spreader clamp pair can be laid with its leading, stretched front edge on a conveyor 30 of the input machine 18 or mangle 17, which loads the laundry item 10 in extended and/or stretched state into the following mangle 17.

In the mangling line shown in FIG. 1, the mangle 17 is formed as a trough mangle. This has two successive mangle rollers 29, each of which has an assigned mangle trough. The mangle 17 may however also have more than two successive mangle rollers 29 and mangle troughs, or only a single mangle roller 29 and mangle trough. A mangle 17 is also conceivable which is configured as a band mangle with one or more mangle bodies around part of which a mangle band is wrapped. Mangled laundry items 10 leave the mangle 17 via a conveyor 32 which transports the mangled and still spread laundry items 10 to the folding machine 19 and loads them there.

At least one imaging device 31 is arranged above the conveyor 32 before the at least one folding machine 19 or similar. This is preferably at least one camera, in particular a digital color camera. Additionally or alternatively to the imaging device 31, a scanner (not shown) may also be assigned to the conveyor 30.

The imaging device 31 is configured such that it identifies each individual laundry item 10, preferably by size, in particular width and length, nature, color, weave structure, and/or folding and stacking or sorting criteria, and in some cases also by customer who will receive the treated laundry item.

The scanner comprises a data carrier in or on the laundry item 10 which contains data for identifying the laundry item 10, in particular data which contains information on the above-mentioned criteria, which alternatively or additionally are recorded by the at least one imaging device 31. A scanner instead of a limiting device 31 may be placed in front of the folding machine 19, if it is to be assumed that each laundry item 10 is provided with a data carrier, for example an RFID chip. If laundry items 10 which have no data carrier are to be treated, only at least one imaging device 28 need be provided before the folding machine 19. It is however also conceivable that before the input machine 18, alternatively or additionally at least one imaging device 28 and/or a scanner is provided which, already before mangling, detects the data and criteria necessary not only for mangling but also for later folding and stacking according to type of the respective laundry item 10, by corresponding identification of the laundry item 10. Then no imaging device 31 and no scanner need be provided before the folding machine 19.

The folding machine 19 is configured such that it automatically folds the laundry items of different type, size and format in the desired fashion. Folding takes place depending on folding criteria which have been detected individually for each laundry item 10 before the folding machine 19, either directly before this or before the input machine 18 of the mangle 17, contactlessly by the imaging device 28 and/or 31 and alternatively or additionally the at least one scanner.

Figure 2:
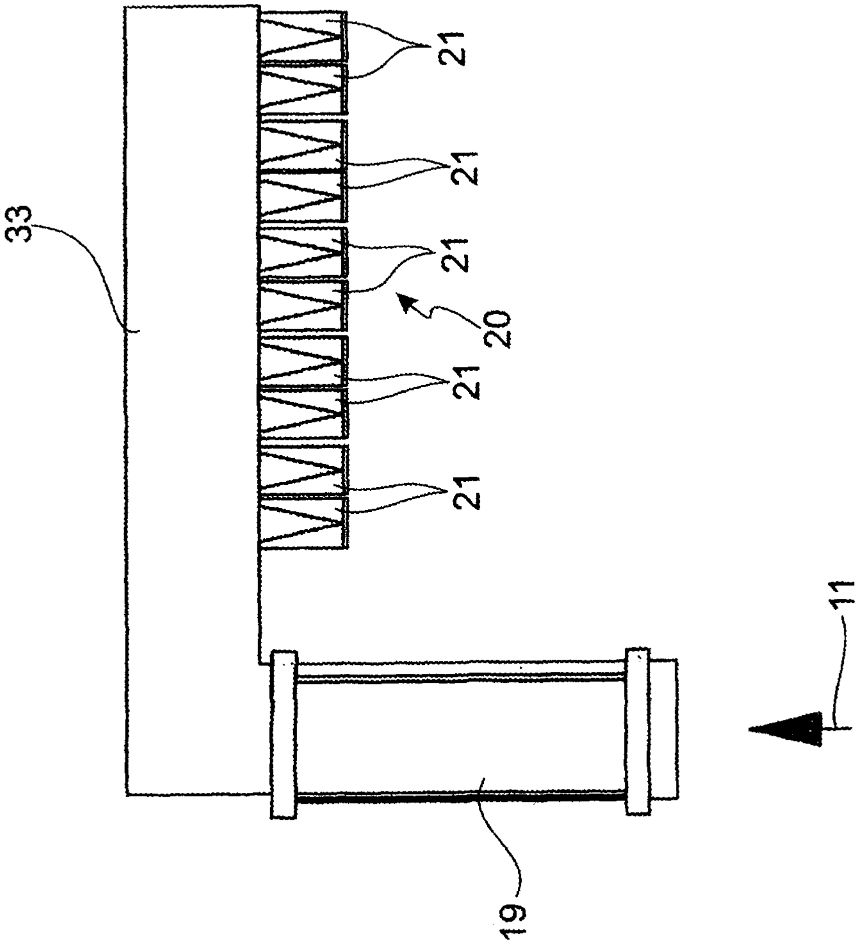
FIG. 2 is a schematic, top view of a folding machine with a plurality of stackers downstream thereof.

FIG. 2 shows in top view the folding machine 19 with the sorting station following this in the treatment direction 11, in particular at least one sorter-stacker 20. The sorter-stacker 20 has a series of several adjacent, preferably identical stackers 21 which follow the folding machine 19 viewed in the treatment direction 11, since they are arranged behind and in some cases below the folding machine 19. In the exemplary embodiment of FIG. 2, the sorter-stacker 20 has ten adjacent and preferably identical stackers 21. Thus, laundry items 10 with up to ten different sorting or stacking criteria are stacked according to type and sorted, preferably also sorted by recipient, such that each stacker 21 receives a stack of folded washing items 10 with the same sorting criteria. The invention is not restricted to the ten stackers 21 shown in FIG. 2. Depending on the number of stacking or sorting criteria for the washing items 10 treated in the treatment line, a larger or smaller number of stackers 21 may be provided. It is also conceivable that, in particular in the case of relatively few sorting criteria, the sorter-stacker 20 has several stackers 21 with the same sorting criteria, or at least certain sorting criteria which apply to frequently occurring laundry items 10. The sorter-stacker 20 and/or its stackers 21 are controlled according to the sorting criteria previously detected for each individual washing item 10 during its identification.

The stacked laundry items 10 leaving the folding machine 19 are transported by a conveyor 33 to the stackers 21 of the sorter-stacker 20. The conveyor 33 is controlled such that a respective folded laundry item 10 reaches the stacker 21 where it is to be supplied to the respective stacker 21 by the conveyor 33 because of the sorting criterion or stacking criterion previously determined.

Figure 3:
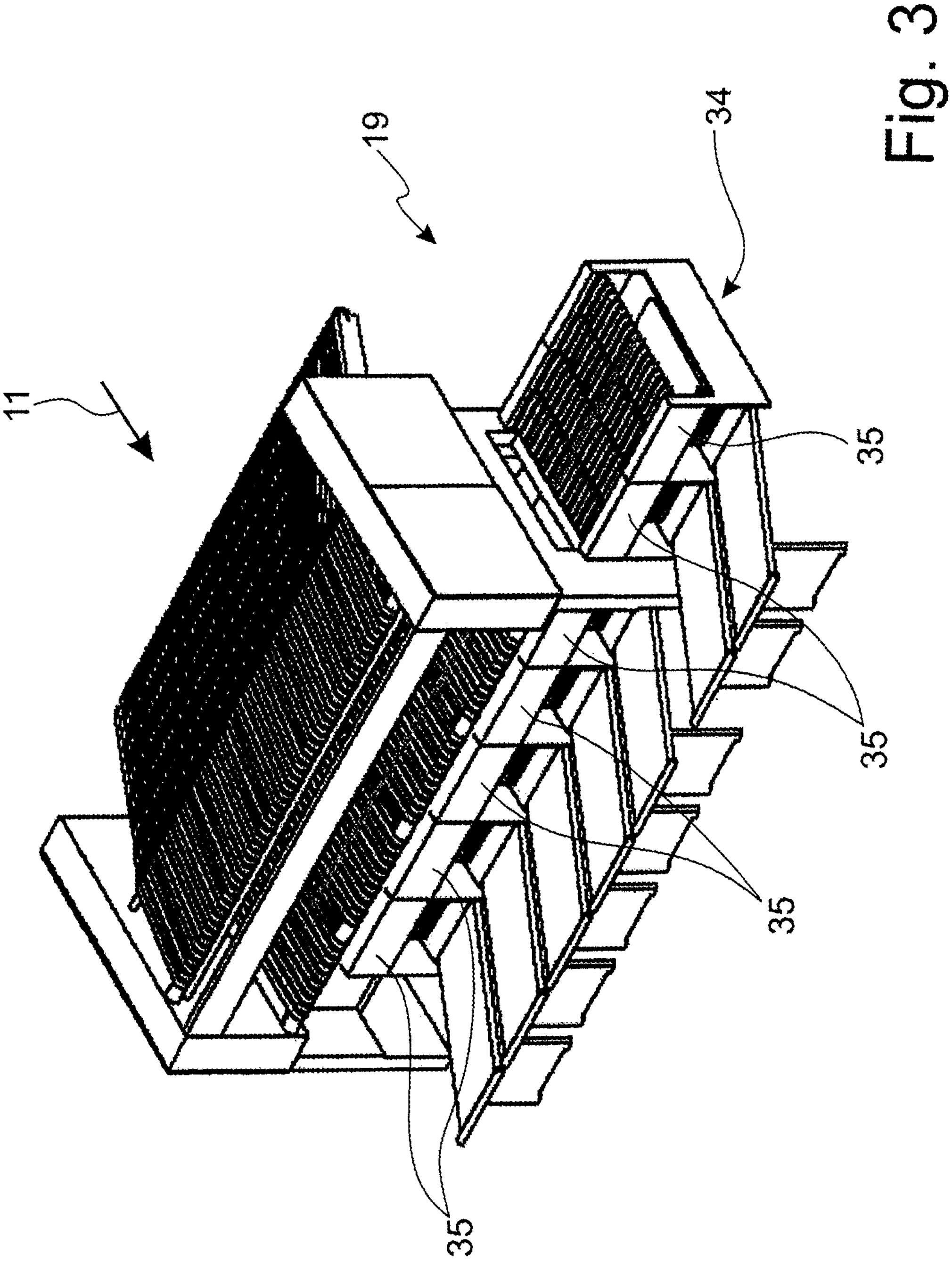
FIG. 3 is a perspective view of another exemplary embodiment of the assignment of stackers to the folding machine.

FIG. 3 shows a spatial depiction (perspective) of a folding machine 19 to which a sorter-stacker 34 is assigned in a different fashion to the exemplary embodiment of FIG. 2. This sorter-stacker 34 also has a series of preferably identical stackers 35 arranged next to one another in a row. FIG. 3 shows a row of seven stackers 35, without the invention being restricted to this.

In this exemplary embodiment, the sorter-stacker 34 with the row of several stackers 35 is arranged below the folding machine 19. The row of adjacent stackers 35 thus runs transversely to the treatment direction 11 and/or the folding machine 19. The number of stackers 35 of the sorter-stacker 34 in FIG. 3, when arranged together in a row transversely to the treatment direction 11, exceeds the width of the folding machine 19. Therefore, in this exemplary embodiment, two stackers 35 are arranged not only below but also laterally next to the folding machine 19. It is also conceivable, in particular in the case of a larger number of stackers 35, to provide at least one stacker 35 below the folding machine 19 on the two opposite sides of the folding machine 19. If the folding machine 19 has only one row with a number of stackers 35 which can all be accommodated together below the folding machine 19, the entire sorter-stacker 34 with all stackers 35 is situated below the folding machine 19. The sorter-stacker 34 and the stackers 35 are configured such that laundry items of the same type can be stacked in each stacker 35.

The method according to the invention is presented below with reference to the above-mentioned treatment line and the folding machines 19 shown in FIGS. 2 and 3, with their assigned sorter-stackers 20 and 34:

The method is distinguished in that, above all, laundry items 10 to be mangled are treated unsorted. The unsorted treatment of the laundry items 10 extends at least to washing, drying, mangling and folding. According to the invention, these laundry items 10 are only sorted during stacking of the treated and stacked laundry items 10.

In the device of FIG. 1, at the start of the treatment line, a sorting stand 12 is provided. Here however, only a simplified sorting takes place, in that for example laundry items which are not to be mangled, e.g., so-called dry laundry, being mainly toweling items, are separated from laundry items 10 to be mangled. In some cases, special items, for example workwear items, may be separated from the laundry items to be mangled at the sorting stand 12. It is also conceivable to separate table linen to be mangled from bed linen to be mangled. In this case, only duvet covers, sheets and pillow cases are treated unsorted in the treatment line. Also or alternatively, table linen such as tablecloths, serviettes, place covers or similar, may be treated unsorted in the treatment line. If only laundry to be mangled is supplied to the laundry, i.e., flat laundry items, the sorting stand 12 may be omitted completely so that then all the flat laundry is treated unsorted, without presorting taking place in the region of the sorting stand 12.

In the following description, it is assumed that only laundry items 10 to be mangled, i.e., flat laundry items, in this case bed linen, are to be treated unsorted in the treatment line. Double-layer duvet covers, single-layer large sheets and double-layer smaller pillowcases are treated unsorted successively in the treatment line and only sorted during or before stacking.

In the washing machine 10, batches of unsorted laundry (here bed linen) supplied by the sack conveyor system 13 or another conveyor system are washed successively in batches or loads. The washed bed linen is then drained in the water extraction device 15 and then dried in one of preferably several adjacent dryers 16, namely so far that the final drying takes place during mangling. The respective batches of washed and dried laundry items 10 are then separated and individual laundry items 10 are successively suspended unsorted in spaced loading clamps 27 of a respective loading clamp pair 26 of the corresponding loading station 25 on the front of the input machine 18. They are suspended by adjacent corners of the front edge, in particular the transverse edge running transversely to the treatment direction 11.

The loading clamps 27 of the respective loading clamp pair 26, in comparison with usual loading clamp pairs 26, have a greater spacing, approximately twice as great. This spacing is selected such that even larger laundry items 10 will have a significantly more identifiable V-shaped sag of the front edge of the laundry item 10, in particular the respective bed linen item. The V-shaped sag of the front edge of the laundry item 10, which forms because of the enlarged spacing of the loading clamps 27 of the loading clamp pair 26, allows the imaging device 28, namely either a camera or a laser fan or laser curtain, to detect and determine the course of the V-shaped sag of the transverse edge. In particular, the lowest point of the sag of the laundry item 10, held in the loading clamps by the adjacent corners of the front edge, is measured by the imaging device 28 or a laser fan or other sensor means. By reference to the known constant spacing of the loading clamps of the loading clamp pair 26 and the distance of the measured lowest point from a theoretical connecting line between the corners of the respective bed linen item in the two loading clamps 27, the length or width of the front edge of the laundry item 10, in particular the respective bed linen item, is determined and preferably calculated. Accordingly, the laundry item 10, which is transferred from the loading clamps 27 to spreading clamps of a spreading device, is then spread by moving the spreading clamps apart accordingly, thus stretching or spreading the front edge of the laundry item 10. The spread laundry item is then supplied by the conveyor 30 to the input machine 18 of the mangle 17, in particular loaded into this.

Then the laundry items 10, which have been loaded unsorted into the mangle 17, in particular bed linen items, are mangled with an unchanged mangling temperature, which is a reduced mangling temperature which does not damage the delicate laundry items 10. For example, for bed linen items, the mangling temperature is adapted to single-layer sheets. Since however double-layer duvet covers and pillowcases contain more moisture, they could be mangled at a higher mangling temperature. Because that is not possible thanks to the successively following, unsorted, delicate (single-layer) and less delicate (double-layer) laundry items 10, less delicate, in particular double-layer laundry items 10 are mangled for a longer time, preferably via an enlarged flattening path of the mangle 17. If the flattening path is sufficiently enlarged, not only can the reduced mangling temperature be retained unchanged, but also the mangling speed. It is however also conceivable, instead of extending the flattening path, to reduce the mangling speed for less delicate, in particular double-layer laundry items 10.

The mangled laundry items 10 leave the mangle 17 via the conveyor 32 which supplies the mangled laundry items 10 to the folding machine 19 or loads the laundry items into the folding machines 19.

At least one further imaging device 31, which is for example a color camera, in particular a digital camera detecting colors, is arranged between the mangle 17 and the folding machine 19. By means of this imaging device 31 before the folding machine 19, each individual mangled laundry item 10 is identified. Not only is the type of the laundry item 10 i.e., duvet cover, sheet or pillowcase, detected but also the size, above all the length and width, and also the color and weave style. This leads to folding and stacking parameters of the respective laundry item 10. Preferably, the customer to whom the treated laundry item 10, in particular bed linen, is to be supplied is also determined by the imaging device 31.

After the laundry items 10, in particular duvet covers, sheets and pillowcases, have been identified by at least one imaging device 28 and/or 31 and/or scanner or data reader, and thereby folding criteria, sorting criteria and in some cases also the customer or recipient of the treated laundry item 10 have been determined, each of the unsorted, successively following laundry items 10 is folded individually in the folding machine 19 according to the folding criteria. For example, in the case of bed linen, duvet covers, sheets and pillowcases are folded individually.

After the laundry items 10 have been folded by the at least one folding machine 19, they are sorted and stacked, preferably stacked after sorting by the respective stacker 21 or 35. In the case of bed linen, they are sorted into duvet covers, sheets and pillowcases, and in some cases also by customer or recipient. Sorting takes place in the single or respective sorter-stacker 20 or 34 to which the several stackers 21 or 35 for different sorting criteria are assigned; in particular, duvet covers are stacked on at least one stacker 21 or 35 provided for this, sheets and pillowcases are respectively stacked on at least one other stacker 21 or 35 for sheets or pillowcases. If, additionally, sorting takes place according to customer or recipient of the respective laundry item 10, then several stackers 21, 35 may be provided for each different type of laundry item 10, for example duvet covers, sheets and pillowcases, wherein then only laundry items 10 of a particular type, for example pillowcases, duvet covers or sheets, but also sorted according to customer or recipient of the treated laundry items 10, are stacked on the same stacker 21, 35. For example, then a stacker 21, 35 forms a sorted stack of duvet covers for the same customer or recipient.

If laundry items 10 not to be mangled, for example so-called dry laundry or toweling items, are supplied to the laundry together with the laundry items to be mangled, these are separated at the sorting stand 12 from the laundry items 10 to be mangled, in particular bed linen, and thereby a presorting is performed. The dry laundry is treated on another treatment line (not shown), for example parallel to the treatment line shown in FIG. 1. The treated and unmangled dry laundry items may be brought together with the mangled laundry items 10 in the region of the conveyor 32 between the mangle 17 and the folding machine 19, and identified by the at least one same imaging device 31 or a data reader and then folded together. Then in at least one sorter-stacker 20 or 34, not only the mangled laundry items 10 but also the laundry items 10 not to be mangled are sorted and stacked on respectively provided separate stackers 21, sorted by type and in some cases by customer.

It is however also conceivable to fold laundry items 10 which are not to be mangled, such as for example dry laundry or toweling items, on a separate folding machine so that at least one further folding machine, for example for toweling items, is provided next to the folding machine 19 for mangled laundry items 10. It may however also be provided to supply the laundry items 10 of different types and folded by different folding machines to at least one common stacking station, for example the sorter-stacker 20 or 34, which sorts all laundry items 10 and stacks them according to type. Each stacker 21 or 35 then stacks laundry items 10 of a same type, in some cases for the same customer, wherein in some cases, for certain types of laundry items 10 and/or customers, several stackers 21, 35 may be provided for stacking laundry items 10 with the same stacking or sorting criteria.

The method according to the invention may be carried out not only for example with the treatment line shown schematically in FIG. 1, but also with other treatment lines which allow laundry items 10 to be treated at least largely unsorted, and only sort these after treatment, in particular after folding, so that treated laundry items 10 of the same type and in some cases for the same customer are stacked in a respective at least one same stack in the at least one sorting and/or stacking station.

LIST OF REFERENCE SIGNS

10 Laundry item
11 Treatment direction
12 Sorting stand
13 Sack conveyor system
14 Washing machine
15 Water extraction device
16 Dryer
17 Mangle
18 Input machine
19 Folding machine

20 Sorter-stacker
21 Stacker
23 Distribution conveyor
24 Collection conveyor
25 Loading station
26 Loading clamp pair
27 Loading clamp
28 Imaging device
29 Mangle roller
30 Conveyor
31 Imaging device
32 Conveyor
33 Conveyor
34 Sorter-stacker
35 Stacker

What is claimed is:

1. A method for treating laundry items (10), wherein the laundry items (10) are at least washed, dried, mangled, folded and stacked, comprising at least washing, drying, mangling, and folding the laundry items (10) unsorted, wherein before mangling and/or folding, a contactless identification is made of the individual laundry items (10), wherein the laundry items (10) are identified by contactless determination of at least the type, size, color, pattern and/or weave style of each individual laundry item (10) by means of at least one imaging device (28, 31), wherein, before folding, the laundry items (10) are identified at least with respect to folding and stacking criteria, each laundry item is folded according to individual folding criteria, and then the laundry items (10) with the same stacking criteria are sorted and stacked on at least one stack for the laundry items (10) with the same stacking criteria, and wherein all of the laundry items (10) are mangled at unchanged mangling temperature, wherein the mangling temperature is selected such that it does not exceed a mangling temperature of the laundry items (10) having the lowest permitted mangling temperature and a flattening path is selected such that the laundry items (10) having the lowest permitted mangling temperature are finally dried during mangling.

2. The method according to claim 1, wherein flat laundry items to be mangled are at least washed, dried, mangled and folded unsorted.

3. The method according to claim 1, wherein on contactless identification of the individual laundry items (10), at least one of the folding criteria is determined.

4. The method according to claim 1, wherein on contactless identification of the individual laundry items (10), at least one of the stacking criteria of each of the laundry items (10) is determined.

5. The method according to claim 1, wherein the laundry items (10) are identified by contactless read-out of data carriers of the laundry items (10).

6. The method according to claim 1, wherein all of the laundry items are mangled at unchanged mangling temperature, wherein the mangling temperature is selected such that it does not exceed a mangling temperature of the laundry items (10) having the lowest permitted mangling temperature and a mangling speed is selected such that the laundry items having the lowest permitted mangling temperature are finally dried during mangling.

7. The method according to claim 1, wherein at least all of the laundry items (10) to be mangled are sorted and stacked after folding.

8. The method according to claim 7, wherein the mangled laundry items (10) are sorted in targeted fashion according to the stacking criteria by determining the stacking criteria of the mangled laundry items (10) performed at the latest before folding, and stacked on at least one stack for laundry items (10) with the same stacking criteria.

9. The method according to claim 1, wherein mangled laundry items (10) are folded according to the folding criteria by determining the folding criteria of the mangled laundry items (10) which takes place at the latest before folding.

10. The method according to claim 1, wherein the laundry items (10) are pre-sorted before washing according to whether they are to be mangled.

11. The method according to claim 10, wherein after the laundry items (10) are pre-sorted and before washing the laundry items (10), the laundry items (10) which are not to be mangled are set aside from the laundry items (10) that are to be mangled.

12. The method according to claim 1, wherein, before folding, different mangled laundry items (10) are brought together with laundry items (10) not to be mangled, and both mangled laundry items (10) and laundry items (10) not to be mangled are folded then sorted and stacked together in arbitrary order.

13. The method according to claim 1, wherein stackers (21) are arranged downstream of a same folding machine (19), wherein the stackers (21) operate according to at least one of the stacking criteria for stacking treated and folded laundry items (10) with the same stacking criteria, whereby the treated and folded laundry items (10) with the same stacking criteria are stacked on the same one of the stackers (21) or on one of the stackers (21) provided for the same stacking criteria.

14. The method according to claim 13, wherein several of the stackers (21) are assigned to the same folding machine (19), wherein the several stackers (21) operate according to at least one of the stacking criteria for stacking treated and folded laundry items (10) for a certain recipient on the same one of the several stackers (21) or on one of the several stackers (21) provided for the certain recipient.

15. The method according to claim 1, wherein, before mangling, at least the length of a front edge of the respective laundry items (10) is determined.

16. The method according to claim 15, wherein, before determining at least the length of the front edge of the respective laundry item (10), the corners of the front edge are held in clamps, whereby a sag of the front edge occurs and is measured, and a determination of the lowest point of the sag of the front edge is measured for assisting in determining the length of the front edge.

* * * * *